US010474229B1

(12) United States Patent
Gollier et al.

(10) Patent No.: US 10,474,229 B1
(45) Date of Patent: Nov. 12, 2019

(54) FOLDED VIEWING OPTICS WITH HIGH EYE TRACKING CONTRAST RATIO

(71) Applicant: Facebook Technologies, LLC, Menlo Park, CA (US)

(72) Inventors: Jacques Gollier, Redmond, WA (US); Andrew John Ouderkirk, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/801,293

(22) Filed: Nov. 1, 2017

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01)

(58) Field of Classification Search
None
See application file for complete search history.

(56) References Cited

U.S. PATENT DOCUMENTS

2014/0375789 A1* 12/2014 Lou ............... G02B 27/0172
348/78
2018/0149862 A1* 5/2018 Kessler ............ G02B 27/30

* cited by examiner

*Primary Examiner* — Christopher J Kohlman
(74) *Attorney, Agent, or Firm* — Kilpatrick Townsend & Stockton LLP

(57) ABSTRACT

An apparatus includes a display configured to emit display light, an optical system configured to provide the display light to an eye of a user and an eye tracking system. The optical system includes a plurality of optical surfaces. The optical system is disposed between an eye tracking light detector and the eye of the user such that a portion of the eye tracking light that is reflected from the eye of the user and is transmitted through the optical system and also reflects from an optical surface of the optical system to generate one or more parasitic reflections of the eye tracking light. At least one of the plurality of optical surfaces is configured to reduce an intensity of the one or more parasitic reflections as measured on a surface of the eye tracking detector.

20 Claims, 10 Drawing Sheets

FOLDED VIEWING OPTICS WITH HIGH EYE TRACKING CONTRAST RATIO

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. In a virtual reality (VR) system, a near eye display panel can be configured to present virtual reality images that depict objects in a virtual reality environment. The display panel may combine real objects with virtual objects, as in AR or MR applications.

An eye-tracking system can track a user's gaze so that the system knows where the user is looking, and thus can provide a more immersive interface and experience. Eye-tracking may also be used for foveated imaging, foveated transmission of image data, alertness monitoring, etc. Existing eye-tracking systems may use light sources (e.g., infra-red light) positioned at the periphery of the user's field of view to illuminate the eye. The light that illuminates the eye may be specularly reflected by the cornea of the user's eye, resulting in "glints" that can be captured by a detector, e.g., by taking an image of the eye using an eye tracking camera. The position, e.g., gaze direction or rotation position, of the eye may be determined based on, for example, the location of the glints relative to a known feature of the eye (e.g., center of the pupil) in the captured image.

As AR/VR/MR systems advance, the internal optical systems within the head mounted displays becomes more complex and improved eye tracking systems are needed that function well with these, often multi-element optical systems.

SUMMARY

The present disclosure relates generally to systems and methods for a head mounted display system that possesses a high eye tracking contrast ratio.

According to some embodiments, the system includes an optical system configured to provide display light to an eye of a user and an eye tracking system. The eye tracking system includes a light source configured to emit eye tracking light, where the light source is positioned to reflect a reflected portion of the eye tracking light off of a surface of the eye of the user and into the optical system. The system also includes an eye tracking light detector configured to detect the reflected portion of the eye tracking light. The optical system includes a plurality of optical surfaces and is disposed between the eye tracking light detector and the eye of the user such that the portion of the eye tracking light that is reflected from the eye of the user is transmitted through the optical system. Reflection from at least one of the plurality of optical surfaces of the optical system can generate one or more parasitic reflections of the eye tracking light. To reduce these parasitic reflections, at least one of the plurality of optical surfaces is configured to reduce an intensity of the one or more parasitic reflections.

In some embodiments, at least one of the plurality of optical surfaces includes a partially reflective optical surface that is partially reflective for the display light (having a first wavelength, e.g., in the visible spectrum) and is transmissive to the eye tracking light (having a second wavelength, e.g., in the IR spectrum).

In some embodiments, at least one of the plurality of optical surfaces includes a reflective polarizer surface that is configured to be a reflective polarizer for light having the first wavelength and transmissive to light having the second wavelength.

In some embodiments, at least one of the plurality of optical surfaces includes a partially reflective optical surface positioned between the display and the eye of the user, and the partially reflective optical surface is configured to transmit a transmitted portion of the display light. The at least one of the plurality of optical surfaces can be configured to reduce an intensity of the one or more parasitic reflections and may include an absorbing optical surface that is positioned between the eye of the user and the reflective polarizer surface.

In some embodiments, the partially absorbing optical surface includes an absorbing polarizer surface that is configured to absorb light at both the first and the second wavelength.

In some embodiments, at least one of the plurality of optical surfaces includes a partially absorbing optical surface positioned between a wave plate and a reflective polarizer surface, where the partially absorbing optical surface is configured to partially absorb light having the second wavelength and transmits light having the first wavelength.

In some embodiments, at least one of the plurality of optical surfaces includes a wave plate surface having an optical bandwidth that includes the first wavelength and excludes the second wavelength.

In some embodiments, the optical system further includes a partially reflective optical element positioned between the display and the eye of the user, where the partially reflective optical element can be configured to transmit a transmitted portion of the display light. The optical system further includes a wave plate configured to receive the transmitted portion of the display light and convert a polarization of the transmitted portion of the display light to a reflecting polarization. The optical system further includes a reflective polarizer that is configured to reflect, back through the optical system, the display light having the reflecting polarization.

In some embodiments, a method includes emitting, by a head mounted display, display light having a first wavelength. The method also includes passing a transmitted portion of the display light through a partially reflective optical element. The method also includes converting, by a wave plate, a polarization of the transmitted portion of the display light to a reflecting polarization. The method also includes reflecting, by a reflective polarizer, the transmitted portion of the display light having the reflecting polarization. The method also includes converting, by the wave plate, the polarization of the transmitted portion of the display light having the reflecting polarization to a circular polarization. The method also includes reflecting, by the partially reflective optical element, a portion of the transmitted portion of the display light having circular polarization to generate a reflected portion of the display light having an opposite circular polarization. The method also includes converting, by the wave plate, the opposite circular polarization of the reflected portion of the display light to a transmitting polarization. The method also includes passing the reflected portion of the display light having the transmitting polarization through the reflective polarizer.

In some embodiments, a method includes emitting, by an eye tracking light source, eye-tracking light having a first wavelength, passing a transmitted portion of the eye tracking light through a reflective polarizer, and converting, by a wave plate, a polarization of the transmitted portion of the eye tracking light to a circular polarization. The method further includes passing the transmitted portion of the eye tracking light through a partially reflective optical element that is partially reflective for display light having a second wavelength that is different from the first wavelength of the eye tracking light and collecting, by an eye tracking detector, the transmitted portion of the eye tracking light.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described with reference to the following figures.

DETAILED DESCRIPTION

Figure 1:
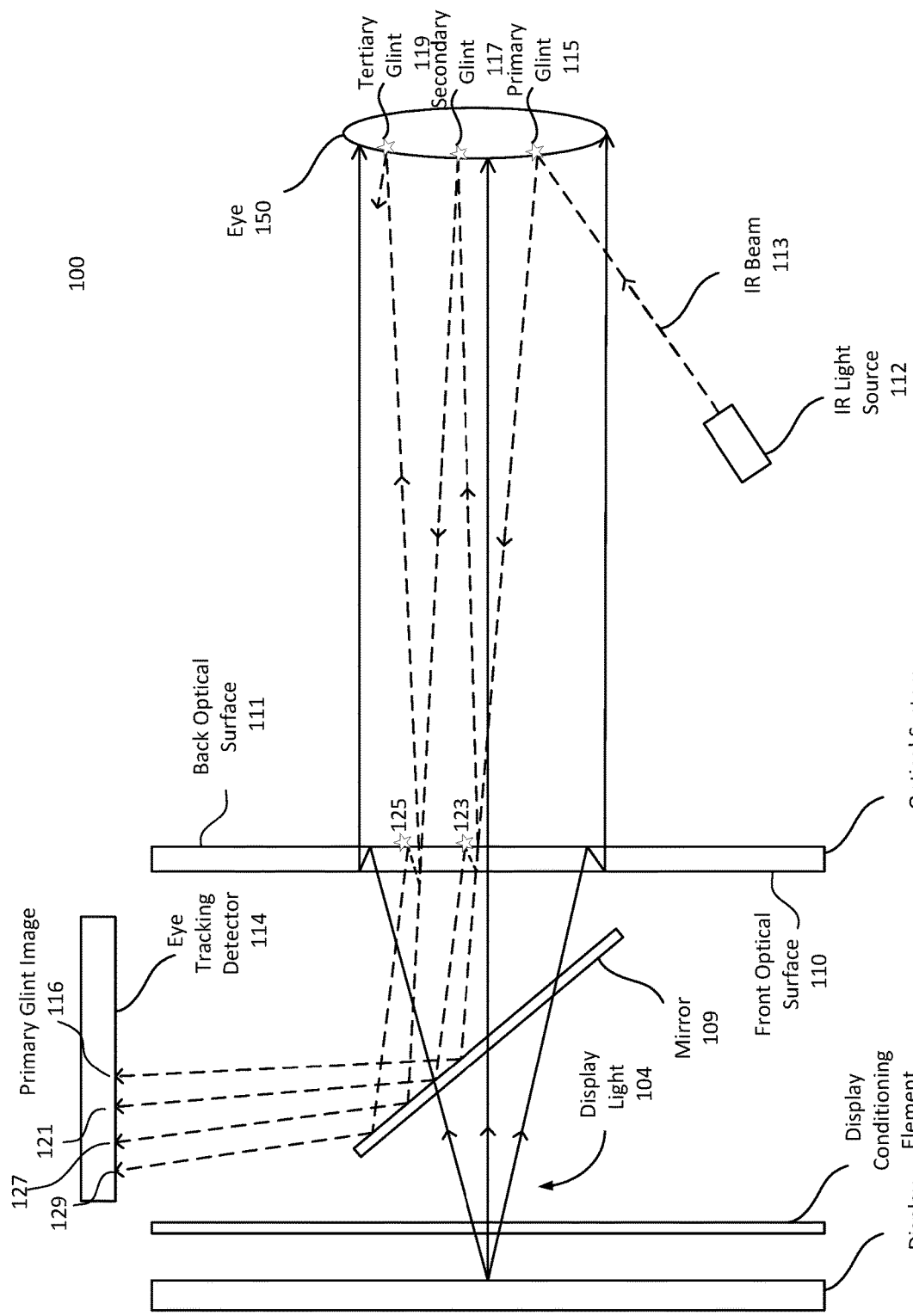
FIG. 1 shows a head mounted display system 100 that employs folded viewing optics with high eye tracking contrast ratio according to some embodiments.

This disclosure relates generally to a head mounted display (HMD) having an improved optical system that enables a high eye-tracking contrast ratio even when employed within a relatively complex optical system. In some embodiments, the HMD employs a folded viewing optical block, referred to herein as a "pancake lens" block. Certain pancake lens blocks that can be used within a VR/AR/MR HMD when used with glint-based eye tracking systems can suffer from an issue where each glint reflects (one or more times) off of one or more internal optical elements of the pancake lens. These so-called parasitic reflections can cause a single glint to appear as multiple glints in the eye tracking detector. The multiple glints will include a bright primary glint followed by one or more "ghost images" of the primary glint that are slightly displaced from the primary glint. The formation of multiple glints can reduce the contrast of the primary glint and can lead to errors in computing the gaze direction. For example, the ghost images can confuse a centroiding algorithm that is used to locate the pupil of the eye based on an assumed glint pattern because the assumed glint pattern may not be precisely what appears within the detector when one or more ghost images are present.

In some embodiments, a pancake lens block can include (starting on the eye-side of the system and travelling outward toward the display): a reflective polarizer, a retardation plate such as a quarter wave plate, and a partially reflecting mirror such as a 50/50 mirror. Any or all of these optical elements may be formed from optical elements having one or more optical surfaces of any shape and curvature, including spherical, cylindrical, aspherical, and the like. In addition, the pancake lens can be made from air-gapped optical elements or from a single monolithic optic that is itself formed form one or more optical elements that are fused/attached together, e.g. using a transparent adhesive or the like.

According to certain embodiments, an improved system can employ a modified pancake lens bock with modified polarizing elements and/or additional absorbing elements that are added to the optical system to either preferentially reflect, block, and/or absorb multiple reflections of the primary glint to eliminate ghost images.

In one embodiment, an absorbing polarizer is placed between the eye and the reflective polarizer of the pancake lens or alternatively, the eye-side surface of the reflective polarizer is coated with an IR absorbing layer. This absorbing layer preferably will absorb enough IR light from the ghost image light so that the ghost image of a glint light ray that reflects off of the reflective polarizer will have, for example, no more than 20% of the power of the original glint light ray.

In some embodiments, an absorbing polarizer is used to reduce not only the ghost images of glints but also to absorb visible light to reduce or eliminate reflections of the user's eyes in the pancake block due to illumination of the eyes from the near-eye display. To also counteract the ghost images of the glints, the band edge of this absorbing polarizer can be pushed into the infrared spectrum to also attenuate in the infrared spectrum as well as in the visible spectrum. Alternatively a second absorbing polarizer can be implemented in addition to the visible absorbing polarizer. As used herein, the term visible spectrum is intended to cover wavelengths in the range of approximately 390 nm to 700 nm. As used herein, the term infrared spectrum is intended to include the broad range of optical wavelengths between the visible and microwaves, e.g., from approximately 700 nm to 1 mm. Common wavelengths used for eye tracking are, e.g., 850 nm and 940 nm which can be achieved by commercially available light emitting diodes (LEDs).

In one embodiment, no additional absorbing polarizer is placed between the eye and the reflective polarizer, but rather, the properties of the reflective polarizer itself are modified such that the reflective polarizer is no longer reflective at the infrared wavelength of the glint and instead is transparent. For example, the reflective polarizer can be made to be reflective in the visible spectrum but transmissive in the IR spectrum, e.g., at 850 nm. In this embodiment, the ghost image of the glint will not form because there is no primary reflection of the IR beam off of the reflective polarizer; the reflective polarizer is transparent in the IR spectrum. As used herein the term transmissive is to be interpreted broadly and includes not only completely transparent materials but also partially transparent materials e.g., having transmission coefficients in the range of, e.g., 40-60% or 30-70%.

In one embodiment, the partially reflective optical element such as a partially reflective mirror at the entrance of the pancake lens can be made to be transparent at the IR wavelength of the glint source (e.g., 850 nm, 940 nm, and the like) while at the same time being partially reflective in the visible spectrum, e.g., reflection coefficient of 50% and transmission coefficient of 50%. As such, this optical element will not contribute to additional ghost images, because the IR glint beam will not reflect there. Absent this modification, it is possible that a fraction of the glint beam may reflect internally within the pancake optic creating multiple internal reflections and exacerbating the ghost imaging problem even further.

In another embodiment, to combat the multiple internal reflections described above, another IR absorbing optical element can be placed within the pancake lens, e.g., between the partially reflecting mirror and the reflective polarizer. Such an optical element can be very effective at eliminating the ghost images caused by multiple reflections because the beam is attenuated for each pass of each of the multiple reflections.

In another embodiment, to eliminate multiple reflections of the glint beam within the HMD, the quarter wave plate of the pancake lens can be made ineffective at IR wavelengths. In such a wave plate the optical bandwidth of the device can include the visible spectrum but exclude the IR wavelength being used. As used herein, the term optical bandwidth as it refers to a retardation plate such as a quarter wave plate is the range of wavelengths over which the wave plate provides the specific λ/4 phase (90 degree) retardation to within some percentage, e.g., to within +/−5 degrees.

FIG. 1 shows a head mounted display system 100 that employs folded viewing optics with high eye tracking contrast ratio according to some embodiments. The system includes a display 103 that emits display light 104 toward the eyes of a user, represented as eye 150 for the sake of simplicity. In some embodiments, the display light 104 can represent media, e.g., one or more images and/or video frames. The display 103 is generally configured to operate as a virtual reality (VR) display, an augmented reality (AR) display and/or a mixed reality (MR) display.

In most AR/VR/MR applications, the display 103 is placed near enough to the eyes of the user that the eyes are unable to focus on the screen. To alleviate this problem, the display system 100 further includes an optical system 107 (also referred to herein as a pancake lens block) that alters the display light 104 such that every point on the display 103 appears to be located at a virtual object plane that is located much farther away from the user (e.g., at infinity in this example). With specific reference to the light rays shown in FIG. 1, in at least one embodiment, the action of the optical system 107 is to take a diverging set of rays of display light 104 that originate from a point the surface of the display 103 and divert, i.e., focus, these diverging rays to parallel rays. With respect to the eye 150, parallel rays are focused onto the retina at the back of the eye (not shown) in a manner that would be identical to rays that originate from an object that is very far away (perfectly parallel rays entering the pupil of the eye will be focused as if they originated from a display surface that is located an infinite distance away from the eye). Accordingly, the action of the optical system 107 is to effectively move the display 103 to the position of a virtual display that is apparently much farther from the eye. Having the display appear as a virtual object at infinity allows the user's eyes to focus on the surface of the display without discomfort. Accordingly, the images being displayed on the display appear to the user to be objects in a far-field scene rather than on a surface of a display that is very close to the user's face. For example, the images on the display could be indistinguishable from a scene a user might expect when looking out a window in the real world.

In some embodiments, the optical system 107 can receive display light that has been conditioned by a display conditioning element 105. The display conditioning element can accomplish a number of functions, including, but not limited to, making the individual pixels of the display 103 less visible to the user and modifying the polarization of the light emitted by the display. For example, the display conditioning element 105 can change the polarization of the display light 104 from a linear polarization to a circular polarization, among other functions. In some embodiments, the optical system 107 is a compound optical system that includes several optical elements such as lenses, wave plates, reflective polarizers, absorbing polarizers, and the like. The conditioned display light that is received by the optical system 107 can then be redirected along a folded path within the optical system 107. As described in more detail below in FIG. 2, the folded path of the conditioned display light can be quite complex. However, for the sake of illustration, the folded path is shown in FIG. 1 as being the result of two reflections: a first reflection from a back optical surface 111 (which may be, e.g., a reflective polarizer) and the second reflection from a front optical surface 110 (which may be, e.g., a partially reflecting mirror) of the optical system 107. The optical system 107 may have other intervening optical elements between the back optical surface 111 and the front optical surface 110 that are not shown here for the sake of simplicity.

Some embodiments may employ an eye tracking system that can track the position of the user's eye. Tracking the eye may include tracking the position and/or shape of the pupil of the eye, and/or the rotational position (gaze direction) of the eye. To track the eye, the HMD system may illuminate a surface of the user's eye using one or more eye-tracking light sources, e.g., IR light source 112, mounted to or inside the HMD system. An eye tracking detector 114, e.g., an imaging device like a camera, can capture images of the glints that result from the specular reflection of the eye-tracking IR light by the cornea of the eye, e.g., primary glint 115 shown in FIG. 1.

One way to illuminate the eye to see the pupil as well as the glints is to use a two-dimensional (2D) array of light-emitting diodes (LEDs). These LEDs may be placed at the periphery of the user's field of view (e.g., along the circumference of the viewing optics).

Numerical techniques, such as a centroiding algorithm, may be employed to accurately determine the locations of the glints on the eye in the captured image, and the rotational position (e.g., the gaze direction) of the eye may then be determined based on the locations of the glints relative to a known feature of the eye (e.g., the center of the pupil) within the captured image.

No matter how many individual IR sources are used to produce the glint pattern, ideally, a single IR beam should only produce a single glint and that single glint will be detected as a single spot on the eye tracking detector 114. For example, in FIG. 1, IR beam 113 can reflect off of the eye 150 and generate the primary glint 115. The reflected IR beam can then pass through the optical system 107, get reflected by a dichroic mirror 109 (which can be reflective in the IR spectrum and transparent in the visible spectrum) and be imaged by the eye tracking detector 114 as primary glint image 116.

In practice, however, a single IR beam 113 can generate not only a primary glint image 116 but can also generate many higher order glints, usually having successively decreasing brightness. For example, one or more additional reflections of a portion of the IR beam 113 that reflect from the back optical surface 111 of the optical system 107 can form secondary glint 117, tertiary glint 119 and so on. Each of these glints can be imaged by the eye tracking detector 114 (e.g., secondary glint image 121) and can appear as "ghost images." Furthermore, one or more internal reflections of the IR beam that originates form the primary, secondary, tertiary, etc., glints can generate one or more ghost glints 123 and 125 that themselves can be imaged by the eye tracking detector 114, e.g., ghost glint images 127 and 129.

The additional glints and ghost glints can greatly complicate the data processing for computing the eye position. For example, the presence of the additional glints and ghost glints may cause errors in the centroiding algorithm, which may determine the center of the glints by finding the pixel location with the most energy in a local neighborhood. The errors may affect the accuracy of eye tracking when the relative location of the glint in the image is used to determine the corneal location in three-dimensional (3D) space. As described in more detail below in reference to FIGS. 2-5, according to certain embodiments, modifications can be made to the head mounted display system 100 to reduce the detected intensity of everything but the primary glint.

Figure 2:
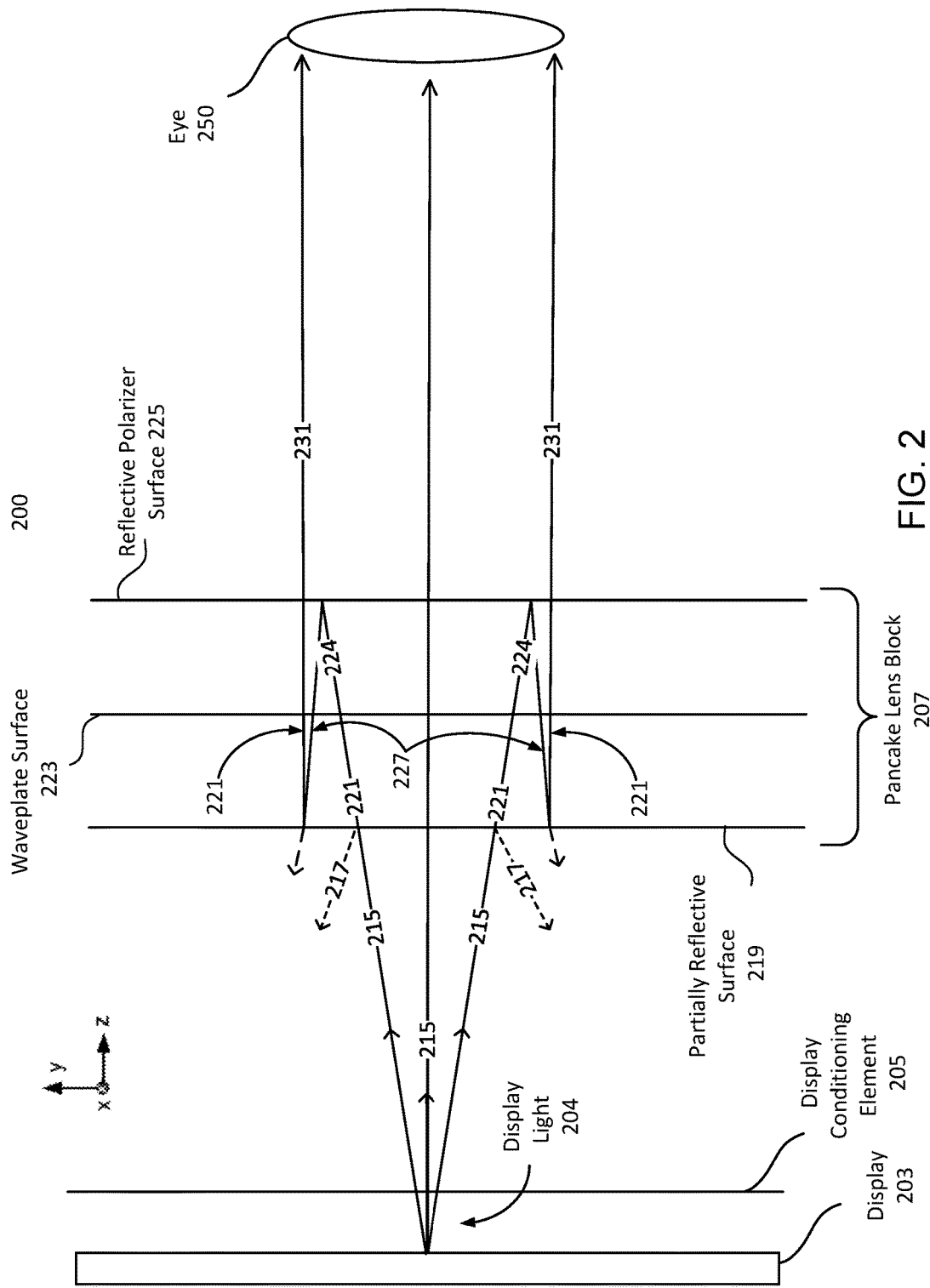
FIG. 2 shows a head mounted display system according to some embodiments.

FIG. 2 shows a head mounted display system having an optical arrangement that is similar to FIG. 1 but instead showing only a subset of elements useful for facilitating a description of the internal details of the optical system 107 according to some embodiments. As described above, the optical system, referred to as pancake lens block 207 in FIG. 2, can be used within a VR/AR/MR system to alter the apparent distance of the display so that a user can comfortably focus on the images generated by the display. In the simplified description below, all optical elements/surfaces are drawn as having a flat, planar shape. However, in some embodiments, it can be advantageous to employ one or more curved surfaces (e.g., mirrors, wave plates, polarizers, and the like) so that the pancake lens block possesses an optical focusing power.

In some embodiments, the display light 204 from the display 203 can be emitted from the display as linearly polarized light, e.g., for the case of an LED/OLED/LCD display, and the like. In some embodiments, the display conditioning element 205 can include a quarter-wave plate that has its slow or fast axis at an orientation relative to the linearly polarized light, e.g., 45 degrees. In such a case, the action of the quarter wave plate is to transform the linearly polarized display light 204 to circularly polarized display light 215. A first reflected portion 217 of the circularly polarized display light 215 can then be reflected by a partially reflective surface 219 and travel back toward the display and eventually out of the system. In some embodiments, the partially reflective surface 219 is configured to reflect 50% of the incident display light 215 and transmit 50% of the incident display light. Accordingly, a second transmitted portion 221 of the circularly polarized display light 215 is transmitted through the partially reflective surface 219 and is directed toward another retardation surface, e.g., quarter-wave plate surface 223. The action of this quarter wave plate surface 223 is to convert the circularly polarized second transmitted portion 221 to linearly polarized light 224. The linearly polarized light 224 now has a polarization direction that is parallel to a reflecting direction (also referred to as a "blocking direction) of a reflective polarizer surface 225.

In general, light that is incident on a reflective polarizer surface is reflected when the light is polarized parallel to the reflecting direction of the polarizer, often referred to as the "blocking direction" of the polarizer (e.g., the x-direction in FIG. 2). As used herein, light having a polarization along this direction is said to have a "reflecting polarization." Likewise, light that is incident on a reflective polarizer surface is transmitted when the light is polarized perpendicular to the reflecting direction of the polarizer, often referred to as the "passing direction" of the polarizer (e.g., the y-direction in FIG. 2). As used herein, light having a polarization along this direction is said to have a "transmitting polarization." In some embodiments, the reflectivity and transmissivity of the reflective polarizer can depend on the wavelength of the incident light as well as the polarization of the incident light. For example, the reflective polarizer surface 225 can be engineered to reflect a high percentage of light in both the visible spectrum and in the IR spectrum, or can be engineered to reflect a high percentage of light in the visible spectrum only and be transparent to certain wavelengths of light in the IR spectrum, as described in more detail below in reference to FIGS. 3A-3D.

In the optical configuration shown in FIG. 2, linearly polarized light 224 has a polarization direction that is parallel to the reflecting direction of the reflective polarizer surface and thus the reflective polarizer functions as a mirror for this light. Accordingly, the linearly polarized light 224 is reflected back through the wave plate surface 223 and is reconverted to circularly polarized light 227. The circularly polarized light 227 is then partially reflected from the partially reflective surface 219. Due to the reflection from the partially reflective surface 219, the handedness of the reflected circularly polarized light 229 is flipped to opposite that of the handedness of the original circularly polarized light 221 (e.g., light 229 will now be right-handed circularly polarized if light 221 was left-handed circularly polarized, or vice versa). The wave plate surface 223 again changes the polarization of the reflected circularly polarized light 229 to linear polarization, but this time the polarization direction of the light 231 is perpendicular to the polarization direction of the original linearly polarized light 224. Accordingly, the light 231 is linearly polarized in a direction that is parallel to the transmitting direction of the reflective polarizer (e.g., the x direction) and is therefore transmitted through the reflective polarizer surface 225, ultimately travelling toward the eye 250 of the user.

In some embodiments, light propagating through the pancake lens block 207 can pass through multiple materials (e.g., air, wave plates, reflectors, glass, adhesive etc.), each material potentially having a different index of refraction. If the indices of refraction are not closely matched, there can be relatively strong multiple reflections (referred to herein as parasitic reflections) from the various optical elements. Under certain circumstances, these parasitic reflections can reduce the contrast for an image displayed from the display 203. In some embodiments, it can be advantageous to have a pancake lens block that is a monolithic element, as shown in FIGS. 4A-4C, that has improved index matching between the elements to reduce some of these parasitic reflections. For example, in some embodiments the various wave plate surfaces, polarizing surfaces, and the mirrored surfaces can be embodied as films or layers on the surfaces of the monolithic element as described in more detail below. In other embodiments, the various optical surfaces can be combined using one or more hybrid optical films. Monolithic embodiments of the pancake lens block are described in detail in U.S. patent application Ser. No. 15/335,5807, the disclosure of which is incorporated by reference herein in its entirety for all purposes. Finally, as already introduced in FIG. 1, IR light from an eye tracking system may also need to pass through the pancake lens block before it is detected. Just as in the case of the display light, multiple parasitic reflections of the eye tracking light can lead to a decrease in contrast for the eye tracking signal. One or more embodiments provide for an improved pancake lens block that can reduce one or more parasitic reflections of the eye tracking light as described below in reference to FIGS. 3A-3D.

Figure 3A:
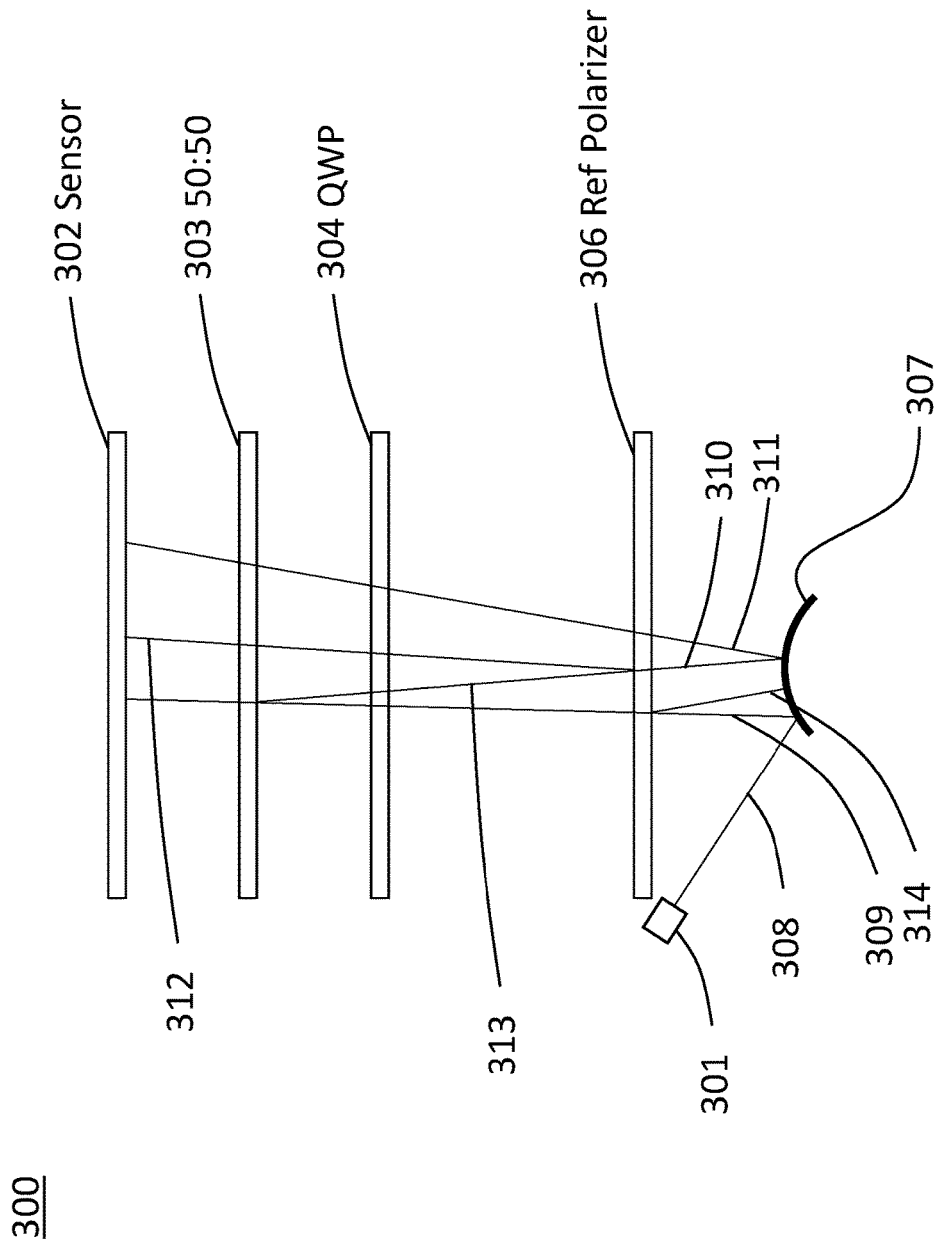
FIGS. 3A-3D show a head mounted display system according to some embodiments.
Figure 4A:
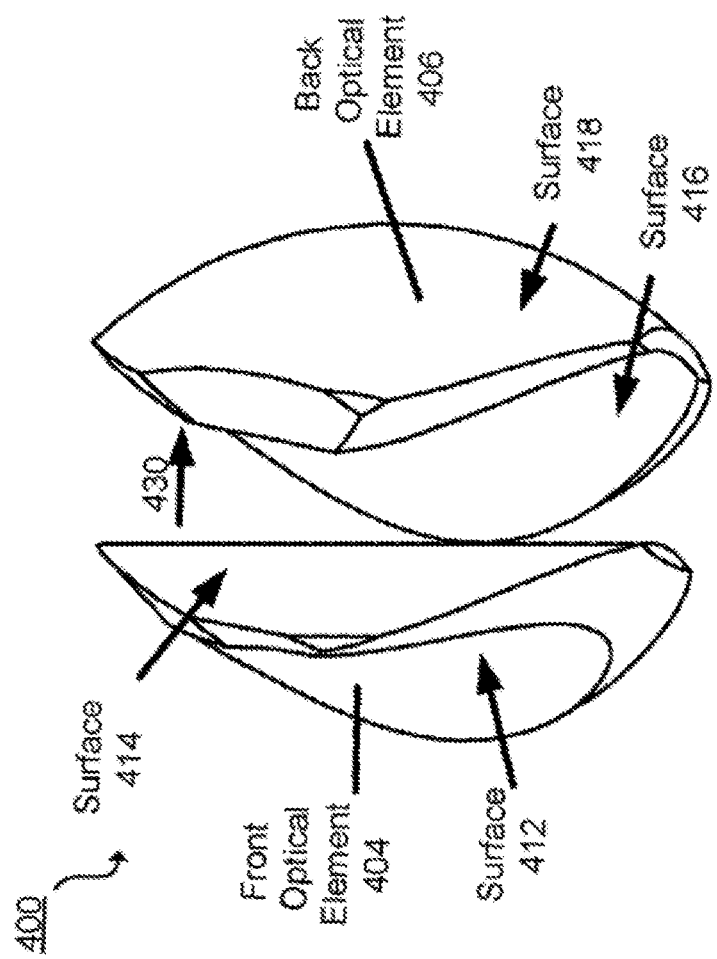
FIGS. 4A-4C is an example assembly of a monolithic pancake lens block 400 with a wide FOV, in accordance with at least one embodiment.
Figure 4B:
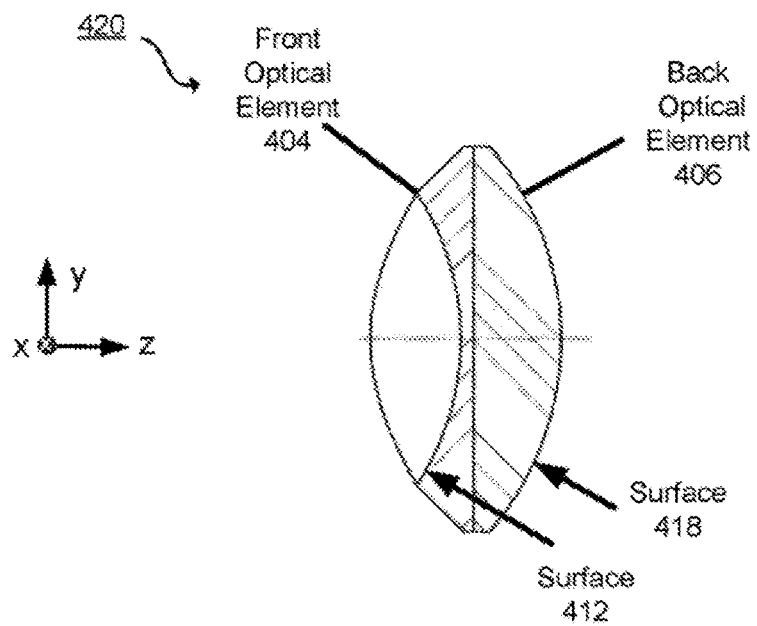
Figure 4C:
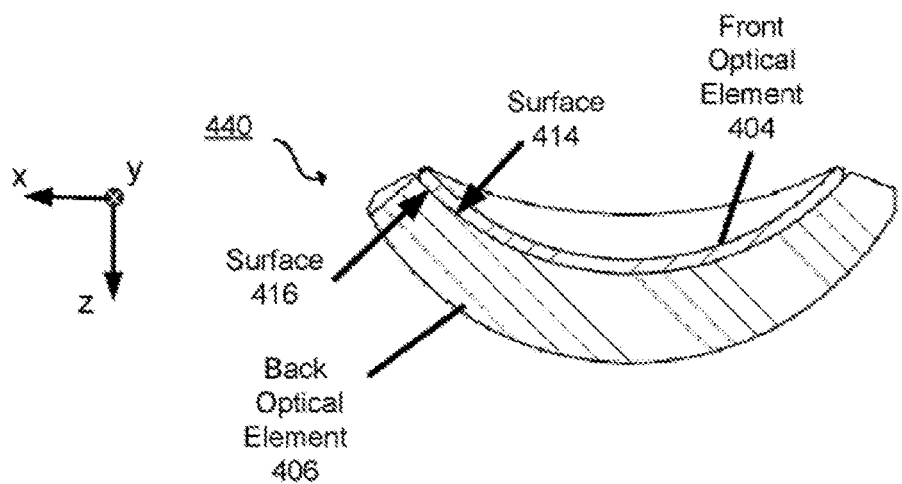

FIG. 3A shows a head mounted display system having an optical arrangement that is similar to FIG. 1 but instead showing the subset of elements for the eye tracking system in order to illustrate the various ways to reduce parasitic reflections and ghost images according to some embodiments. As in FIG. 1, the eye tracking system 300 includes a light source 301 that emits infrared eye tracking light 308 and an eye tracking sensor 302 that can detect in the infrared. In some embodiments, light source 301 may be an LED, a VCSEL, a super-radiant LED, a laser diode, ambient IR light, or any other source of IR illumination. In some embodiments, the eye tracking sensor 302 may be an imaging or non-imaging sensor that detects light emitted from the light source 301 after it has reflected off of the surface of the eye 307. As used herein the term "surface of the eye" or "eye surface" should be interpreted broadly to include any surface of the eye, e.g., a retinal surface, a surface of the crystalline lens, a corneal surface, etc. Examples of non-imaging sensors include photodiodes such as PN diodes, PIN diodes, and avalanche diodes. Imaging sensors can include CCD, CMOS-based sensor arrays and the like. In some embodiments, the sensor may also include ray-path diverting optics such as beam splitters, including partially reflective beam splitters and dichroic beam splitters and or mirrors, e.g., dichroic mirror 109 shown in FIG. 1. The sensor 302 may further include imaging optics (not shown). For the sake of clarity, these additional optical elements are not shown in FIG. 3A, but one of ordinary skill in the art with the benefit of this disclosure will appreciate that many different configurations are possible.

As described above in reference to FIGS. 1-2, the eye tracking system may be part of an AR/VR/MR head mounted display system and thus may share a number of the same optical elements that are already present for conditioning and modifying the light that is emitted from a near eye display. For example, a pancake lens block may be employed. In some embodiments, the pancake lens block includes a partial reflector 303, a quarter wave plate 304, and a reflective polarizer 306. In some embodiments, a partial reflector 303 that is about 50% reflective and about 50% transmissive for the display light can be employed. Examples of suitable partial reflectors include metalized coatings, dielectric multilayer coatings, and combinations of metal and dielectric coatings, e.g., dielectric/silver/dielectric coatings and the like. In some embodiments, reflective polarizers such as those based on cholesterics and birefringent polymers can be employed. In some embodiments, reflective polarizers can transition from being mostly transmitting to mostly reflecting (for a given polarization) over a range of wavelengths defined by the reflection "band edge." As used herein, the term reflection band-edge refers to the wavelength where the reflective polarizer is about 50% reflective for light having polarization that is parallel to the reflection polarization axis, as measured from longer to shorter wavelengths (also referred to as the "long band edge").

As already described in detail above, the eye tracking system 300 can employ an light source 301, e.g., an IR light source, that illuminates the user's eye 307, thereby creating reflection 309 from the cornea and/or iris of the user's eye 307. Specularly reflected ray 309 can then be detected by the sensor 302, and information from the sensor 302 can be used to determine the gaze direction of the user.

However, as introduced above in reference to FIGS. 1-2, one or more parasitic reflections may be caused by additional reflections from one or more of the sub-elements of the pancake lens block. For example, a portion of the light from ray 309 can be reflected from the reflective polarizer 306 and be redirected toward the eye 307 as parasitic reflection ray 314. In addition, the partial reflector 303 may reflect a portion of reflected ray 309 to form parasitic reflection ray 313, a fraction of which will be reflected by reflective polarizer 306 thereby generating another parasitic reflection ray 312. In some cases this parasitic retro-reflection between the reflective polarizer 306 and the partial reflector 303 can generate multiple parasitic reflection rays, but only two are shown here for the sake of simplicity. The parasitic reflection rays can be detected by the sensor 302 and can reduce the contrast ratio of the glint images detected by the sensor, or form ghost images, or both. Furthermore, a portion 310 of the light associated with parasitic reflection ray 313 may be transmitted through the reflective polarizer 306 and reflect again off of the eye, creating parasitic reflection ray 311. Like the others, parasitic reflection ray 311 may be emitted at an angle that is ultimately detectable by sensor 302, and thus, it can also can reduce the contrast ratio and/or form ghost images on the sensor 302.

In view of the above, the single IR beam can generate multiple parasitic reflection rays 311, 312, 313, 314, etc., the intensities of which should be reduced relative to the primary glint reflected ray 309 if accurate eye tracking is to be achieved. In the description that follows, several different embodiments are described that provide for a reduction of the intensity of the parasitic reflection rays 311, 312, 313, 314, etc. In these embodiments, one or more additional IR absorbing elements are added to the pancake lens block or the IR reflectivity of one or more of the existing elements of the pancake lens block is modified to reduce the relative intensity for the parasitic reflection rays.

Figure 3B:
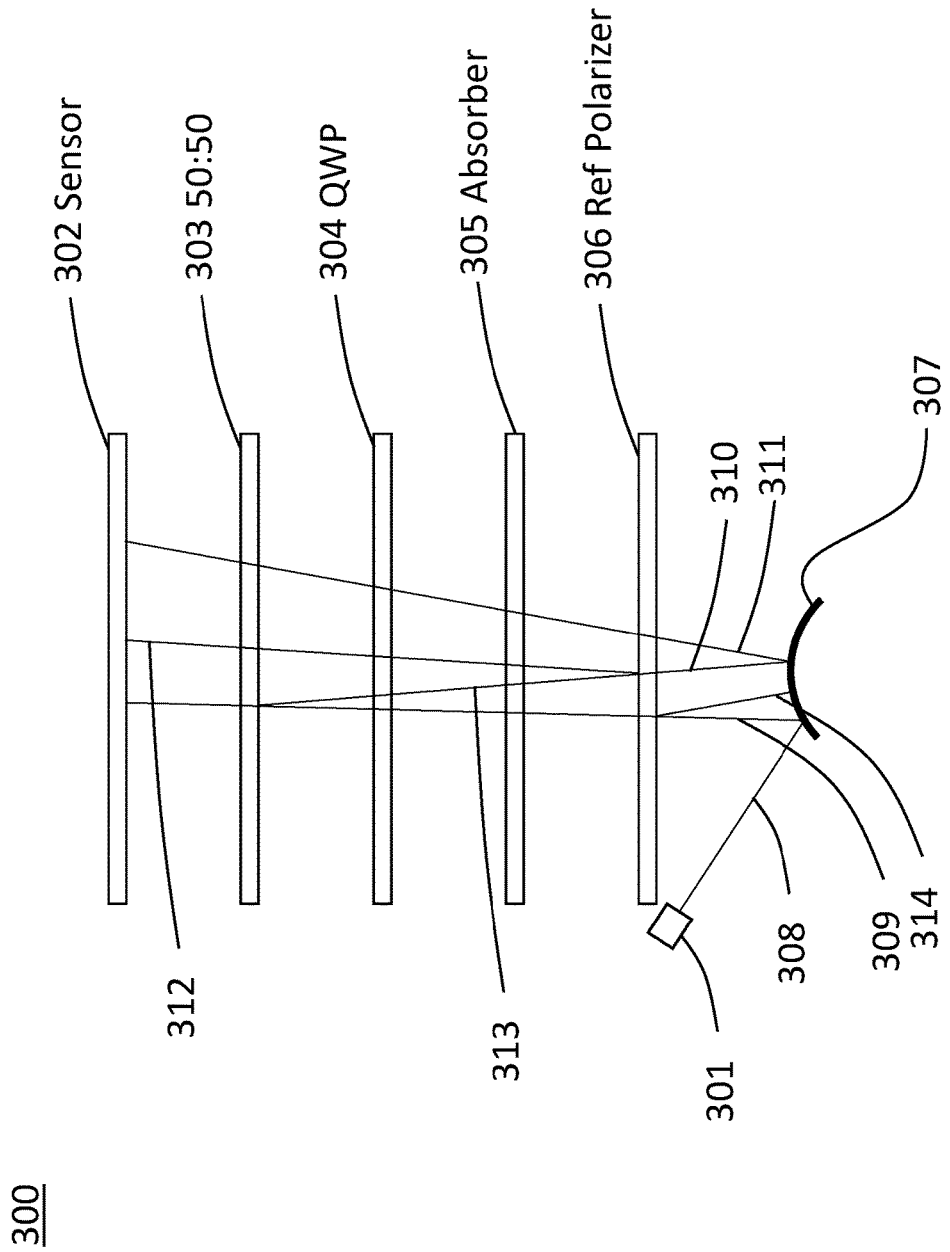

In the embodiment shown in FIG. 3B, parasitic reflections are reduced by employing an IR absorbing surface 305 within the pancake lens block. In some embodiments, the IR absorbing surface 305 can absorb between 20-80% of the IR light emitted by the IR source, or in the case of an ambient IR light source, 20-80% of the IR light detected by the sensor. In some instances, it may be preferable to absorb less light in which case the absorber can be engineered to absorb between 30-70% or between 40-60%. In addition to absorbing IR light, the IR absorbing surface can transmit >60% of visible light. In some embodiments, >80% or even >90% transmissivity are advantageous. In some embodiments, where it may be difficult to produce an IR absorber with both high IR absorptivity and low visible absorptivity, the absorption in the visible can be engineered to be similar to the absorption in the IR. For example, the IR absorbing surface can have an absorptivity of less than, e.g., 99%, 90%, or even 80% in the IR and visible spectra.

Ignoring any other IR losses in the system and assuming the low end of the IR absorption range quoted above, e.g., 20% absorption coefficient, the IR absorber still will result in significant reduction in the intensity of rays 312 and 311 relative to the primary glint ray 309. This reduction is because each of rays 312 and 311 make two additional trips through the absorber as compared to the primary ray. In addition, rays 312 and 311 pass through the 50-50 mirror one additional time relative to the primary glint ray 309.

Figure 3C:
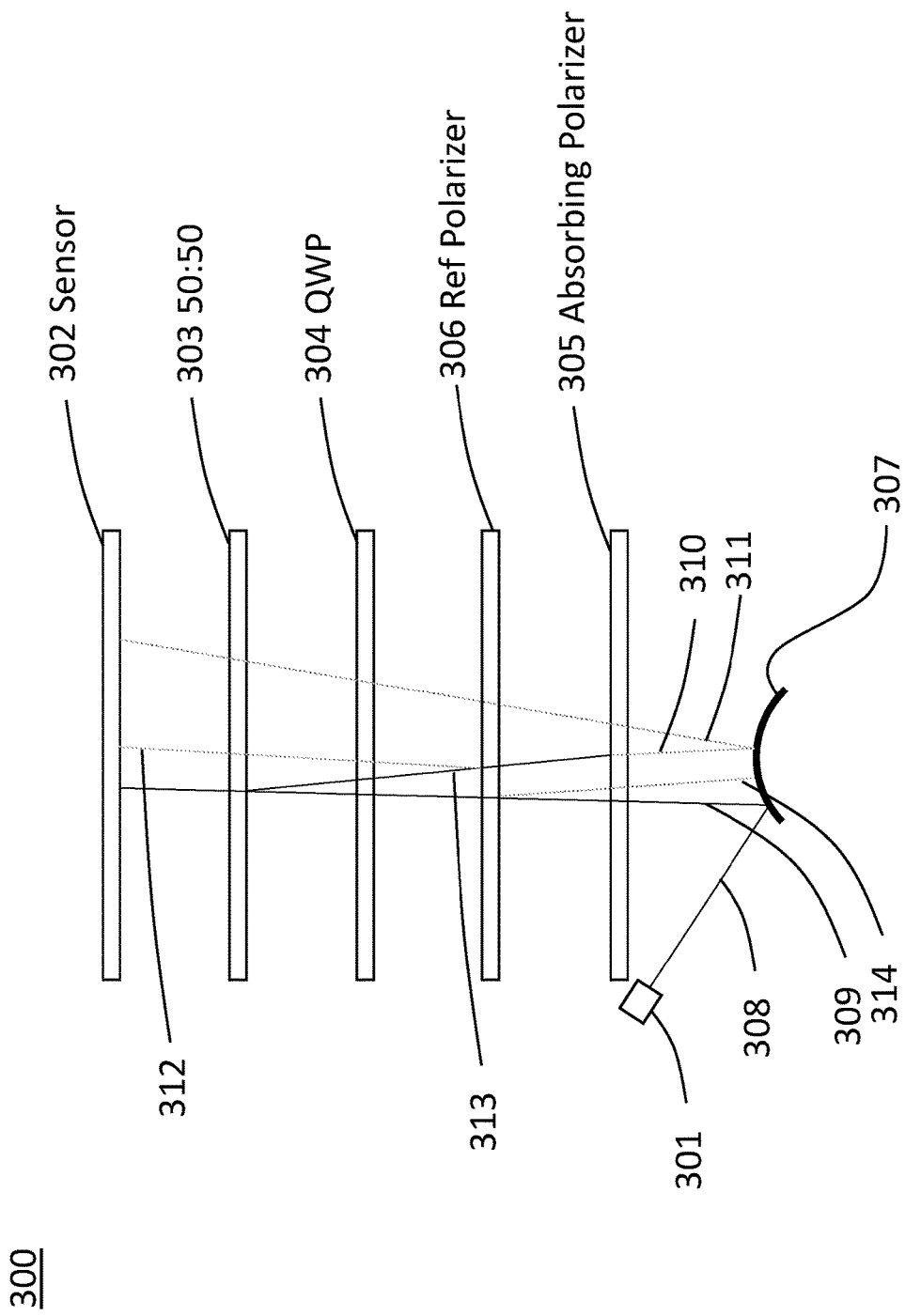

In the embodiment shown in FIG. 3C, the parasitic reflections are reduced by employing an absorbing polarizer surface 305 located between the eye of the user and the reflective polarizer 306. In some embodiments, the reflective polarizer 306 can be designed such that it preferentially reflects visible light for the reflecting polarization and preferentially transmits IR light of the wavelengths emitted by the light source 301, regardless of the polarization of the IR light. The low IR reflectivity of the reflective polarizer 306 reduces or eliminates the reflected rays 312 and 314. The IR light then strikes the absorbing polarizer 305, which can be designed to at least absorb the IR light of the wavelengths emitted by the light source 301. The absorption of the IR light by the absorbing polarizer 305 reduces or eliminates the parasitic reflection ray 311. Thus, in cases wherein the reflective polarizer 306 does not affect the polarization of the IR light, the absorbing polarizer surface 305, partial reflector 303, and quarter-wave plate 304 taken together act as an effective optical isolator for the IR light.

Figure 3D:
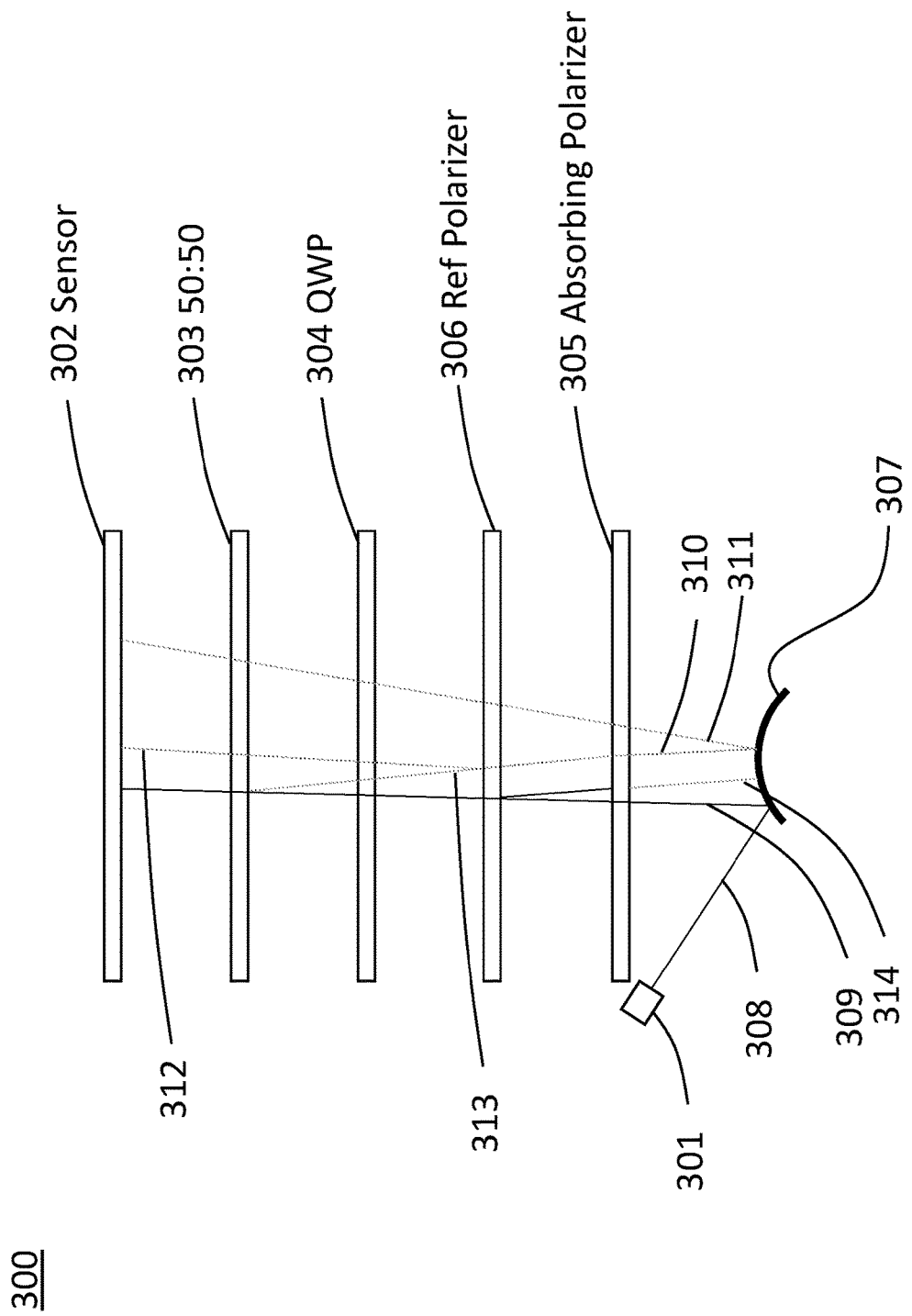

In the embodiment shown in FIG. 3D, the partial reflector 303 is designed to be a partial reflector for visible light, but preferentially transmit IR light of the wavelengths emitted by light source 301. Suitable partial reflectors include metalized coatings, dielectric multilayer coatings, and combinations of metal and dielectric coatings. An example of the latter is a dielectric/silver/dielectric coating. The thickness of the coating layers may be optimized such that the partial reflector has similar reflectivity for the different visible wavelengths emitted by the display, and preferably has less reflectivity for the IR source than in the visible spectrum. In some embodiments, the reflector has less than 40% reflectivity for light emitted by the IR source, but other embodiments may employ less than 20%, or even less than 10% reflectivity. By reducing the IR reflectivity of the partial reflector 303, rays 310, 311, 312, and 313 can be greatly reduced or even eliminated. In addition, by orienting the transmission axis of the absorbing polarizer 305 to be perpendicular to the reflecting direction of the reflective polarizer 306, the ray 314 can also be eliminated.

If the absorbing polarizer also absorbs in the visible spectrum, this configuration also advantageously reduces a mirror effect that can be present on the eye-facing surface of the reflective polarizer 306. In operation, the user's eye is always being illuminated by the display light and some of that display light can be visible to the user on the eye-facing surface of the reflective polarizer 306. However, by orienting the transmission axis of the absorbing polarizer 305 to be perpendicular to the reflecting direction of the reflective polarizer 306 any visible light that happens to be reflected from the reflective polarizer 306 is also subsequently blocked by the absorbing polarizer 305. In this case, the band edge of the absorbing polarizer 305 should extend far enough past the IR wavelength that is being used for the eye tracking, e.g., past 850 nm or 940 nm, to insure that the reflections of both the visible light from the display and the IR light from the reflective polarizer are both absorbed by the absorbing polarizer 305. For example, the absorption coefficient in the IR and the visible can be made to be approximately 50%, 75%, or 90%.

Another alternative employs a quarter wave plate 304 that operates in the visible range but is ineffective in the IR range. Referring back to FIG. 1 for illustrative purposes, in this case, reflected ray 312 can be eliminated because the parasitic reflection light ray 313 would not have the proper polarization to be reflected off of the reflective polarizer. Instead it would be transmitted through to the eye where it will be reflected as ray 311. However the relative intensity of ray 311 may be already dramatically reduced by the time it reaches the sensor 302. Relative to the primary glint ray it will have been reduced to approximately 4% of the primary glint's intensity due to the second reflection off of the user's eye and then reduced a further 50% percent due to it passing through the partial reflector 303 before encountering the sensor 302.

While each of the above embodiments are described separately in reference to FIGS. 3A-3D, they may be employed together in any combination without departing from the scope of the present disclosure.

FIG. 4A is an example assembly of a monolithic pancake lens block 400 with a wide FOV, in accordance with at least one embodiment. The pancake lens block 400 includes a front optical element 404 and a back optical element 406. The front optical element has a surface 412 (e.g., front first surface) closer to the user's eye and a surface 414 (e.g., front second surface) which couples with the back optical element 406. The back optical element 406 has a surface 416 (e.g., back second surface) which couples with the front optical element 404 and a surface 418 (e.g., back first surface) which is closer to the display 103. The front surface of optical element 404 is an embodiment of the front optical surface 110, and the back surface of optical element 406 is an embodiment of the back optical surface 111. Accordingly, the surfaces of each optical element are also embodiments of the surfaces described above with reference to FIGS. 1, 2, 3A-3D.

In some embodiments, the surface 412 may include a reflective polarizer like the reflective polarizer surface 225 discussed above with reference to FIG. 2. Likewise, the surface 412 may include a separate absorbing layer that corresponds to absorbing polarizer 305 of FIG. 3C or the two layers may be formed from one hybrid layer. Back surface 418 may include one or more layers or coatings to implement the partially reflective surface 219. In some embodiments, the mirrored surface 418 may be replaced with a hybrid film that acts as both a quarter wave plate and a partially reflective optical element, e.g., a partially reflective mirror.

The front optical element 404 is shown to be separated from the back optical element 406, but the monolithic pancake lens block 400 is the front optical element 404 coupled to the back optical element 406, in a manner as indicated by the arrow 430 in which the surface 414 of the front optical element 404 is coupled to the surface 416 of the back optical element via, e.g., an adhesive. The front optical element 404 is shaped such that the surface 412 may have a concave spherical surface profile, and the surface 414 has a convex cylindrical surface profile. The back optical element 406 is shaped such that the surface 416 has a concave cylindrical surface profile, and the surface 418 may have a convex spherical surface profile. The layer to be bonded to surface 414 and surface 416 may be a planar surface or sheet of material. Because surface 414 and surface 416 are based on the shape of a cylinder, the sheet can be placed flat on the surface and easily bonded to or between surfaces.

FIG. 4B shows a y/z-axis cross section 420 of an example monolithic pancake lens block 400 with a wide FOV, in accordance with at least one embodiment. In contrast to FIG. 4A, FIG. 4B shows the front optical element 404 and back optical element 406 coupled together.

FIG. 4C shows a x/z-axis cross section 440 of an example monolithic pancake lens block 400 with a wide FOV, in accordance with at least one embodiment.

In contrast to FIG. 4A, FIG. 4C shows the front optical element 404 and back optical element 406 coupled together.

Figure 5:
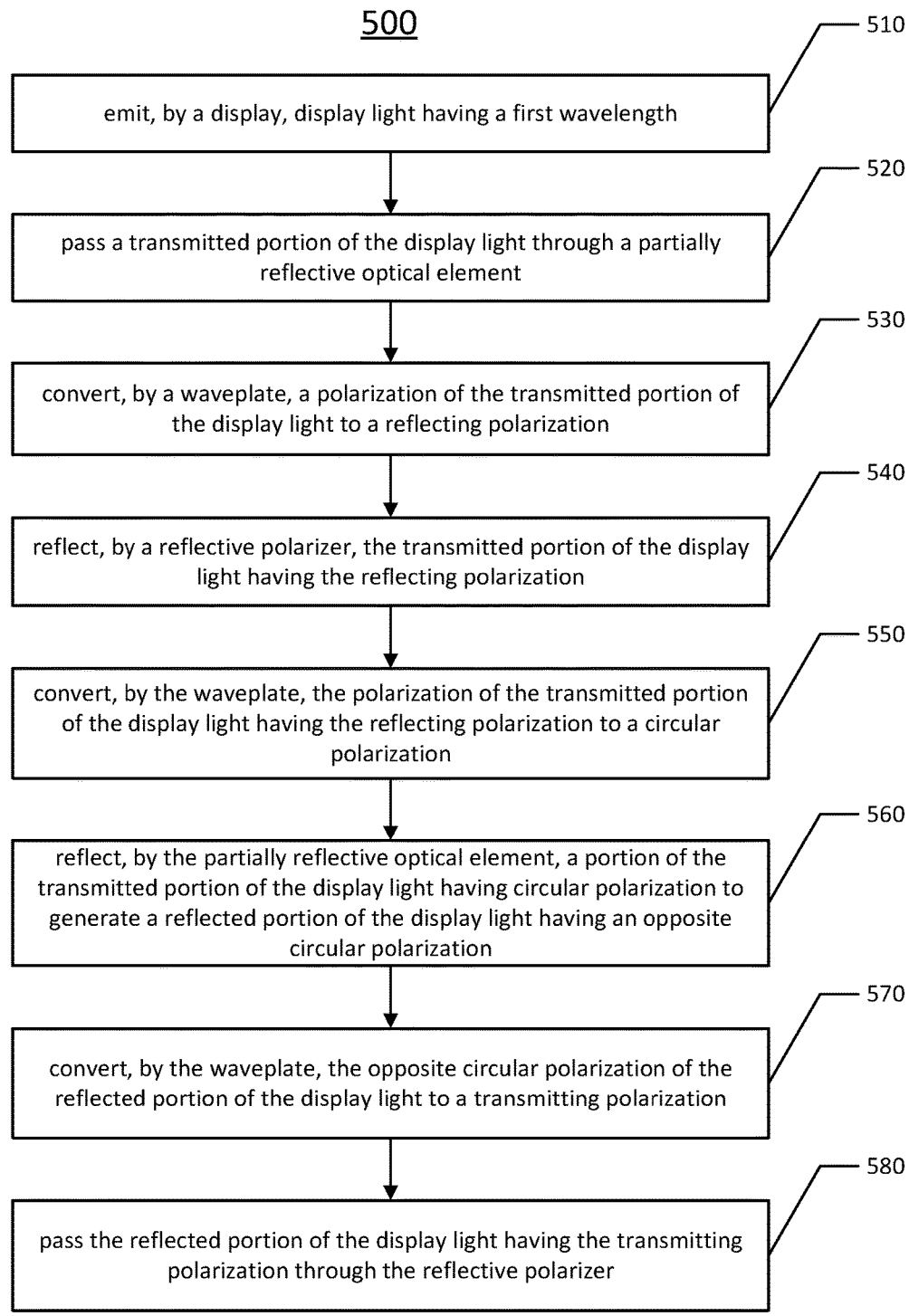
FIG. 5 illustrates a flow chart for a method of operating a head mounted display in accordance with one or more embodiments.

FIG. 5 illustrates a flow chart for a method in accordance with one or more embodiments. More specifically, FIG. 5 illustrates a method for projecting display light through a head mounted display system to an object, e.g., to the eyes of a user. The head mounted display is configured with an arrangement of optical elements that provide a high contrast ratio for eye tracking light as described above.

In step 510, display light having a first wavelength is emitted by a display. As used herein, the term "first wavelength" is not limited to monochromatic light but rather covers display light including at least one wavelength, e.g., the display light can be light of many wavelengths spanning the visible spectrum, such as the light emitted by display 103 of FIG. 1.

In step 520, the emitted display light encounters a partially reflective optical element or surface, e.g., partial reflective surface 219 shown in FIG. 2 or partial reflector 303 shown in FIG. 3. A portion, referred to herein as the transmitted portion, of the emitted light can be transmitted through the partially reflective optical element and a portion, referred to herein as the reflected portion, can be reflected from the partially reflective optical element. For example, the transmitted portion can be ½ of the intensity of the originally emitted display light and the reflected portion can be ½ the intensity of the originally emitted display light. In some embodiments, the partially reflective optical element is partially reflective for the display light but is transmissive to eye tracking light. This allows the partially reflective optical element to reduce parasitic reflections of IR tracking light and to reduce ghost images as described above in reference to FIG. 3D.

In step 530, the polarization of the transmitted portion of the display light is converted, e.g., converted from a circular polarization to a linear reflecting polarization, by a wave plate, e.g., by a quarter-wave retarding surface 223 shown in FIG. 2 or the quarter-wave plate 304 of FIGS. 3A-3D. As used herein the term "circularly polarized light" is intended to cover not only perfectly circularly polarized light but may also include any elliptically polarized light. Likewise the wave plates employed herein may impart the appropriate retardation to convert either circular or elliptical light to linearly polarized light and vice versa. As used herein, the term "reflecting polarization" is defined to be a linear polarization of light that is oriented parallel to a reflection, or blocking, axis of a reflective polarizer, e.g., reflective polarizer surface 225 shown in FIG. 2 or reflecting polarizer 306 in FIGS. 3A-3D. In some embodiments, the light can be first passed through an absorbing optical element before it is directed toward the reflecting polarizer. In some embodiments, the absorbing optical element can be an absorbing polarizer that is configured to absorb both display light and eye tracking light. Adding the absorbing element at this stage provides for a reduction of parasitic reflections of the IR tracking light and to reduce ghost images as described above in reference to FIG. 3B.

In step 540, the transmitted portion of the display light having the reflecting polarization is then reflected by a reflecting polarizer, e.g., reflective polarizer surface 225 shown in FIG. 2. In some embodiments, this results in the transmitted portion of the light being redirected backward along the original input direction so that it encounters the wave plate again (or encounters the absorbing element again then the wave plate). In some embodiments, the reflective polarizer is configured to be a reflective polarizer for the display light but be transmissive to eye tracking light as described above in reference to FIG. 3C thereby providing for a reduction of parasitic reflections of the IR tracking light and to reduce ghost images.

In step 550, the polarization of the transmitted portion of the display light having the reflecting polarization is transformed again, e.g., converted back to circular polarization, by the wave plate. This circularly polarized light continues back through the optical system toward the partially reflective optical element.

In step 560, a portion of the transmitted portion of the display light having circular polarization is reflected by the partially reflective optical element to generate a reflected portion of the display light. Because of a π phase retardation picked up upon reflection, the reflected portion now has a circular polarization that is opposite to the original circular polarization of the originally transmitted portion. For example, if the original display light was conditioned to be right-handed circularly polarized light, the reflected portion of the display light having a circular polarization created in step 560 would be left-handed circularly polarized.

In step 570, the wave plate then converts the opposite circular polarization of the reflected portion of the display light to a transmitting polarization. For example, the transmitting polarization can be a linear polarization that is perpendicular to the reflecting direction (block direction) of the reflecting polarizer. In some embodiments, before this portion of the light is passed through the reflecting polarizer, it is passed through an absorbing optical element. While this absorbing element may serve to attenuate some of the visible wavelength display light, it will also attenuate any IR eye tracking light that also passes through the absorber and will result in a higher eye tracking contrast ratio as described above in reference to FIG. 3B.

In step 580, the reflecting portion of the display light having the transmitting polarization is passed, i.e., transmitted, through the reflecting polarizer, e.g., toward the eye of a user.

In some embodiments, after passing the reflected portion of the display light having the transmitting polarization through the reflective polarizer, this portion of the display light can also be passed through an absorbing optical element, e.g., the absorber 305 that, in some embodiments may be a polarization insensitive absorber or an absorbing polarizer. In some embodiments, the absorption coefficient of the absorbing optical element is greater in the IR than in the visible so as to preferentially absorb the IR eye tracking light. In other embodiments, the partially absorbing optical element is an absorbing polarizer that is configured to absorb both display light and eye tracking light. While this absorbing element may serve to attenuate some of the visible wavelength display light, it will also attenuate any IR eye tracking light that also passes through the absorber and will result in a higher eye tracking contrast ratio as described above in reference to FIGS. 3C-3D.

Figure 6:
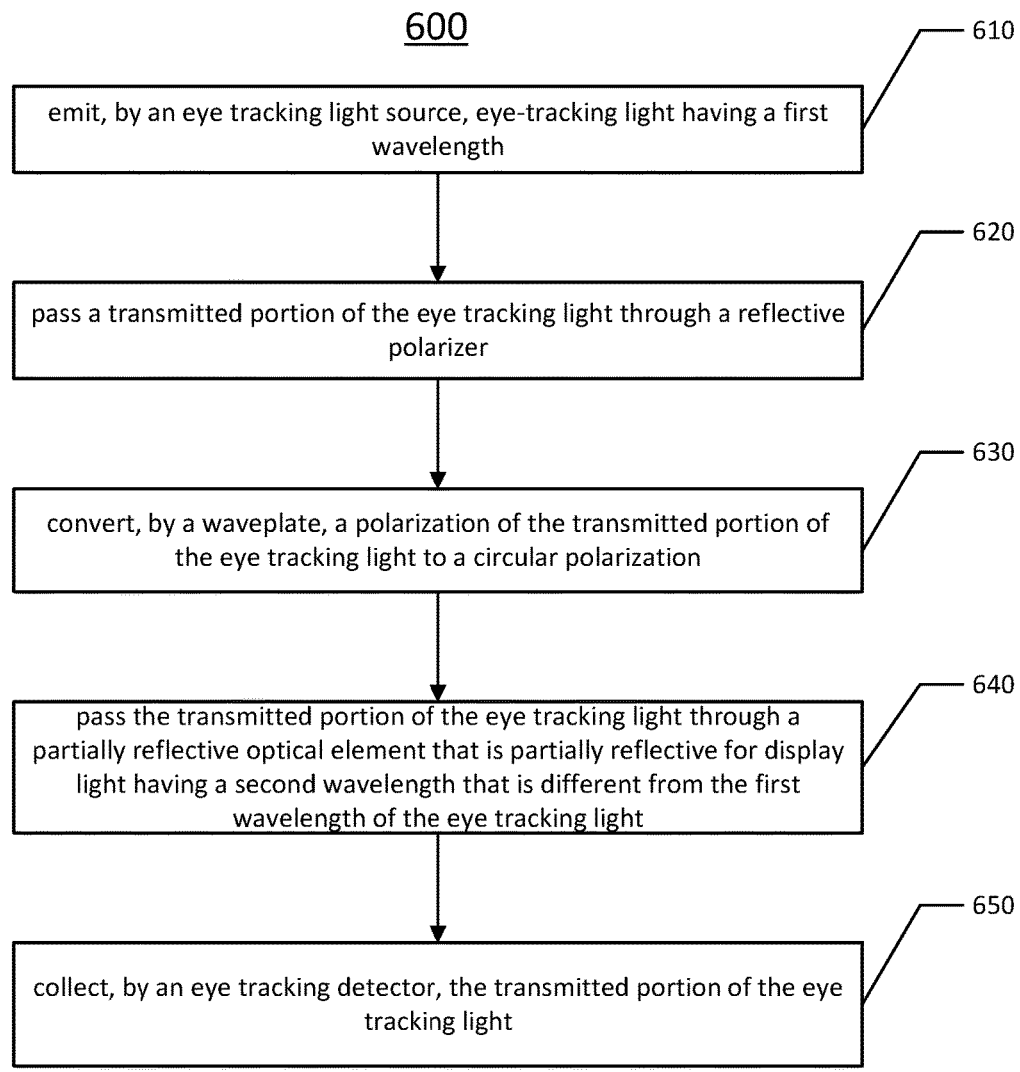
FIG. 6 illustrates a flow chart for a method of operating a head mounted display in accordance with one or more embodiments.

FIG. 6 illustrates a flow chart for a method in accordance with one or more embodiments. More specifically FIG. 6 illustrates a method for projecting IR tracking light through a head mounted display system in order to improve eye tracking contrast ratio and accuracy as described above in reference to FIGS. 3A-3D and FIG. 5 above.

In step 610, eye tracking light is emitted by an eye tracking light source. In some embodiments the eye tracking light source can be an IR light source, e.g., as described above in reference to FIG. 2 and FIGS. 3A-3D.

In step 620, a portion of the eye tracking light is passed through a reflective polarizer. In some embodiments, the portion of the eye tracking light that is passed through the reflective polarizer is reflected from a surface of a user's eye, e.g., a corneal surface, retinal surface, of surface of a crystalline lens of the eye. In some embodiments, the eye tracking light can be passed through an absorbing optical element before being passed through the reflective polarizer, e.g., as described above in reference to FIGS. 3C-3D.

In step 630, the polarization of the transmitted portion of the eye is converted by a wave plate. In some embodiments the polarization can be converted from a linear polarization to a circular or elliptical polarization. In some embodiments, before the polarization is converted by the wave plate, the eye tracking light can be passed through an absorbing optical element, as described above in reference to FIG. 3B.

In step 640, the transmitted portion of the eye tracking light is passed through a partially reflective optical element. In some embodiments, the partially reflective optical element is partially reflective for display light (having one or more wavelengths in the visible spectrum) and is transmissive for the eye tracking light (having one or more wavelengths in the IR spectrum), as described above in reference to FIG. 3D.

In step 650, an eye tracking detector collects the transmitted portion of the eye tracking light. In some embodiments, this collected eye tracking light is used to track the position of a user's eye.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description of the embodiments of the disclosure presented above has been presented for the purpose of illustration; it is not intended to be exhaustive or to limit the disclosure to the precise forms disclosed. Persons skilled in the relevant art can appreciate that many modifications and variations are possible in light of the above disclosure.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to a system for performing the operations described. The system may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   a display configured to emit display light having a first wavelength;
   an optical system configured to provide the display light to an eye of a user; and
   an eye tracking system comprising:
      a light source configured to emit eye tracking light having a second wavelength, wherein the light source is positioned such that a portion of the eye tracking light is reflected off of a surface of the eye of the user and into the optical system; and
      an eye tracking light detector configured to detect the reflected portion of the eye tracking light,
   wherein the optical system comprises a plurality of optical surfaces,
   wherein the optical system is disposed between the eye tracking light detector and the eye of the user such that the portion of the eye tracking light that is reflected from the eye of the user is transmitted through the optical system and also reflects from at least one of the plurality of optical surfaces of the optical system to generate one or more parasitic reflections of the eye tracking light, and
   wherein at least one of the plurality of optical surfaces is configured to reduce an intensity of the one or more parasitic reflections of the eye tracking light having the second wavelength.

2. The apparatus of claim 1, wherein the at least one of the plurality of optical surfaces that is configured to reduce an intensity of the one or more parasitic reflections comprises a partially reflective optical surface that is partially reflective for light having the first wavelength and is transmissive to light having the second wavelength.

3. The apparatus of claim 1, wherein the at least one of the plurality of optical surfaces that is configured to reduce an intensity of the one or more parasitic reflections comprises a reflective polarizer surface that is configured to be a reflective polarizer for light having the first wavelength and transmissive to light having the second wavelength.

4. The apparatus of claim 3,
   wherein the plurality of optical surfaces includes a partially reflective optical surface positioned between the display and the eye of the user, and the partially reflective optical surface is configured to transmit a transmitted portion of the display light,
   wherein the at least one of the plurality of optical surfaces that is configured to reduce an intensity of the one or more parasitic reflections comprises an absorbing optical surface that is positioned between the eye of the user and the reflective polarizer surface, and
   wherein the partially absorbing optical surface is configured to partially absorb a reflected portion of the eye tracking light that is reflected from the partially reflective optical surface.

5. The apparatus of claim 4, wherein the partially absorbing optical surface comprises an absorbing polarizer surface that is configured to absorb light at both the first and the second wavelength.

6. The apparatus of claim 1, wherein the at least one of the plurality of optical surfaces that is configured to reduce an intensity of the one or more parasitic reflections comprises a partially absorbing optical surface positioned between a wave plate and a reflective polarizer surface, wherein the partially absorbing optical surface is configured to partially absorb light having the second wavelength and transmits light having the first wavelength.

7. The apparatus of claim 1, wherein the at least one of the plurality of optical surfaces is that configured to reduce an intensity of the one or more parasitic reflections comprises a wave plate surface having an optical bandwidth that includes the first wavelength and excludes the second wavelength.

8. The apparatus of claim 1, wherein the optical system comprises:
   a partially reflective optical element positioned between the display and the eye of the user, the partially reflective optical element configured to transmit a transmitted portion of the display light;
   a wave plate configured to receive the transmitted portion of the display light and convert a polarization of the transmitted portion of the display light to a reflecting polarization; and
   a reflective polarizer that is configured to reflect, back through the optical system, the display light having the reflecting polarization.

9. A method comprising:
   emitting, by a head mounted display, display light having a first wavelength;
   passing a transmitted portion of the display light through a partially reflective optical element;
   converting, by a wave plate, a polarization of the transmitted portion of the display light to a reflecting polarization;
   reflecting, by a reflective polarizer, the transmitted portion of the display light having the reflecting polarization;
   converting, by the wave plate, the polarization of the transmitted portion of the display light having the reflecting polarization to a circular polarization;
   reflecting, by the partially reflective optical element, a portion of the transmitted portion of the display light having circular polarization to generate a reflected portion of the display light having an opposite circular polarization;
   converting, by the wave plate, the opposite circular polarization of the reflected portion of the display light to a transmitting polarization; and passing the reflected portion of the display light having the transmitting polarization through the reflective polarizer.

10. The method of claim 9, wherein the partially reflective optical element is partially reflective for display light and is transmissive to eye tracking light.

11. The method of claim 9, wherein the reflective polarizer is configured to be a reflective polarizer for the display light and transmissive to eye tracking light.

12. The method of claim 9, further comprising, after passing the reflected portion of the display light having the transmitting polarization through the reflective polarizer, passing the reflected portion of the display light having the transmitting polarization through an absorbing optical element.

13. The method of claim 12, wherein the partially absorbing optical element is an absorbing polarizer that is configured to absorb both display light and eye tracking light.

14. The method of claim 12, further comprising:
passing eye tracking light from a light source of an eye tracking system through the absorbing optical element.

15. The method of claim 14, wherein an absorption coefficient of the absorbing optical element is greater for the eye tracking light than for the display light.

16. The method of claim 9, further comprising, after converting the polarization of the transmitted portion of the display light having the reflecting polarization to a circular polarization, and before passing the reflected portion of the display light having the transmitting polarization through the reflective polarizer:
passing the reflected portion of the display light having the transmitting polarization through an absorbing optical element.

17. The method of claim 16, wherein the absorbing optical element is an absorbing polarizer that is configured to absorb both display light and eye tracking light.

18. A method comprising:
emitting, by an eye tracking light source towards a user's eye, eye tracking light having a first wavelength;
passing a transmitted portion of the eye tracking light reflected by the user's eye through a reflective polarizer;
converting, by a wave plate, a polarization of the transmitted portion of the eye tracking light to a circular polarization;
passing the transmitted portion of the eye tracking light having the circular polarization through a partially reflective optical element that is partially reflective for display light having a second wavelength that is different from the first wavelength of the eye tracking light; and
collecting, by an eye tracking detector, the transmitted portion of the eye tracking light.

19. The method of claim 18 further comprising, before passing the transmitted portion of the eye tracking light through the reflective polarizer:
passing the eye tracking light through an absorbing optical element.

20. The method of claim 18 further comprising, after passing the transmitted portion of the eye tracking light through the reflective polarizer, and before converting the polarization of the transmitted portion of the eye tracking light to a circular polarization:
passing the eye tracking light through an absorbing optical element.

* * * * *